US011084570B2

(12) United States Patent
Carrie

(10) Patent No.: US 11,084,570 B2
(45) Date of Patent: Aug. 10, 2021

(54) CONTROL STICK PIVOT

(71) Applicant: RATIER-FIGEAC SAS, Figeac (FR)

(72) Inventor: Jean-Paul Carrie, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 4 days.

(21) Appl. No.: 16/095,503

(22) PCT Filed: Apr. 22, 2016

(86) PCT No.: PCT/IB2016/000670
§ 371 (c)(1),
(2) Date: Oct. 22, 2018

(87) PCT Pub. No.: WO2017/182836
PCT Pub. Date: Oct. 26, 2017

(65) Prior Publication Data
US 2019/0127081 A1 May 2, 2019

(51) Int. Cl.
B64C 13/04 (2006.01)
B64D 45/00 (2006.01)
(Continued)

(52) U.S. Cl.
CPC .......... *B64C 13/0421* (2018.01); *B64D 45/00* (2013.01); *F16C 19/16* (2013.01);
(Continued)

(58) Field of Classification Search
CPC ..... B64C 13/04; B64C 13/0421; B64C 13/00; B64D 45/00; B64D 2045/0085;
(Continued)

(56) References Cited

U.S. PATENT DOCUMENTS 2,475,393 A * 7/1949 Keahey ............... F16C 11/0614
384/212
3,429,198 A 2/1969 Bretl
(Continued)

FOREIGN PATENT DOCUMENTS

CN 103292995 9/2013
FR 3001706 * 8/2014
(Continued)

OTHER PUBLICATIONS

Bearing—definition of bearing by The Free Dictionary, dictionary. com. Dec. 2, 2020 (Year: 2020).*
(Continued)

*Primary Examiner* — Vinh Luong
(74) *Attorney, Agent, or Firm* — Cantor Colburn LLP

(57) ABSTRACT

A control stick pivot (200) comprises a primary pivot bearing (210), a redundant pivot bearing (220), and a detection component for detecting malfunction of the primary pivot bearing. The redundant pivot bearing is provided on one side of the primary pivot bearing. The redundant pivot bearing becomes operative as a bearing in the event that the primary pivot bearing malfunctions. The detection component may comprise one or more features (230) provided on the redundant pivot bearing for applying a torque to the redundant pivot bearing during maintenance or testing and/or a sensor (300; 310; 320) configured to detect relative motion at an interface between the primary pivot bearing and the redundant pivot bearing.

20 Claims, 4 Drawing Sheets

(51) Int. Cl.
*F16C 19/16* (2006.01)
*G05G 9/047* (2006.01)
*G05D 1/00* (2006.01)
*G05D 1/08* (2006.01)

(52) U.S. Cl.
CPC ......... *G05D 1/0077* (2013.01); *G05D 1/0808* (2013.01); *B64D 2045/0085* (2013.01)

(58) Field of Classification Search
CPC .............. G05G 9/047; G05G 9/04; G05G 2009/04714; F16C 19/16; F16C 21/00; G05D 1/0077; G05D 1/0808; Y10T 29/49696; Y10T 74/20201; Y10T 29/49826; Y10T 74/20037
See application file for complete search history.

(56) References Cited

U.S. PATENT DOCUMENTS

| | | | |
|---|---|---|---|
| 4,811,921 A | 3/1989 | Whitaker et al. | |
| 4,865,277 A | 9/1989 | Smith et al. | |
| 5,261,291 A * | 11/1993 | Schoch | B60K 37/06 180/333 |
| 6,092,934 A | 7/2000 | Kettler | |
| 2008/0088397 A1* | 4/2008 | Kretschmer | G05G 9/047 335/205 |
| 2008/0115611 A1* | 5/2008 | Larson | B64C 13/04 74/471 R |
| 2011/0048153 A1* | 3/2011 | Standke | G05G 5/05 74/471 XY |
| 2011/0112705 A1 | 5/2011 | Antraygue | |
| 2013/0133465 A1* | 5/2013 | Kreitmair-Steck | B64C 13/345 74/504 |
| 2014/0097300 A1* | 4/2014 | Kennedy | B64C 13/12 244/229 |
| 2014/0341486 A1* | 11/2014 | Schwaiger | F16C 32/02 384/3 |
| 2016/0122001 A1* | 5/2016 | Kennedy | B64C 13/0425 244/223 |

FOREIGN PATENT DOCUMENTS

| | | | |
|---|---|---|---|
| FR | 3001707 | * | 8/2014 |
| RU | 2207454 C2 | | 6/2003 |
| RU | 2537364 C2 | | 1/2015 |
| WO | WO 2017/182835 A1 | * | 10/2017 |

OTHER PUBLICATIONS

Define malfunction—Google Search, google.com, Dec. 2, 2020 (Year: 2020).*
Definition of bearing, Merriam-Webster.com., Dec. 2, 2020 (Year: 2020).*
International Search Report for Application No. PCT/IB2016/000670, dated Sep. 22, 2016, 2 pages.
Written Opinion of the International Searching Authority for Application No. PCT/IB2016/000670, dated Sep. 22, 2016, 5 pages.
Grant Decision for Application No. RU2018139016/11(064853), dated Oct. 9, 2019, 13 pages.
Office Action for Application BR112018071564-6, dated Jul. 30, 2020, 4 pages.

* cited by examiner

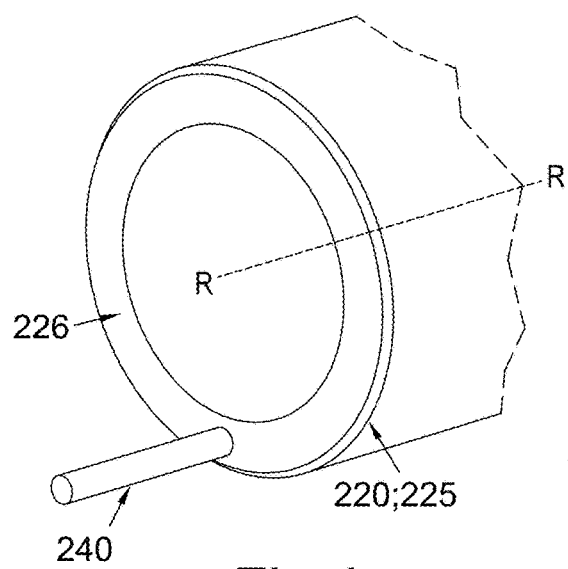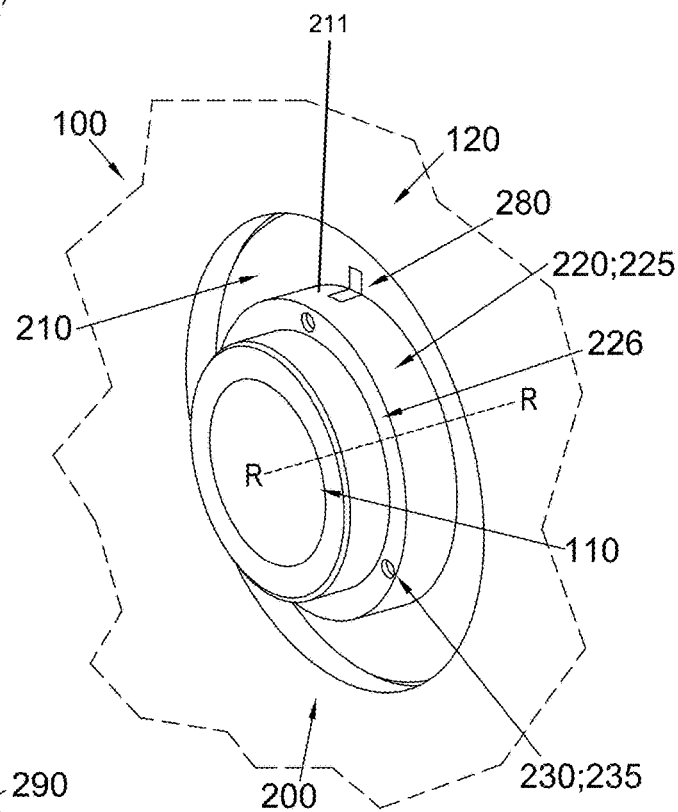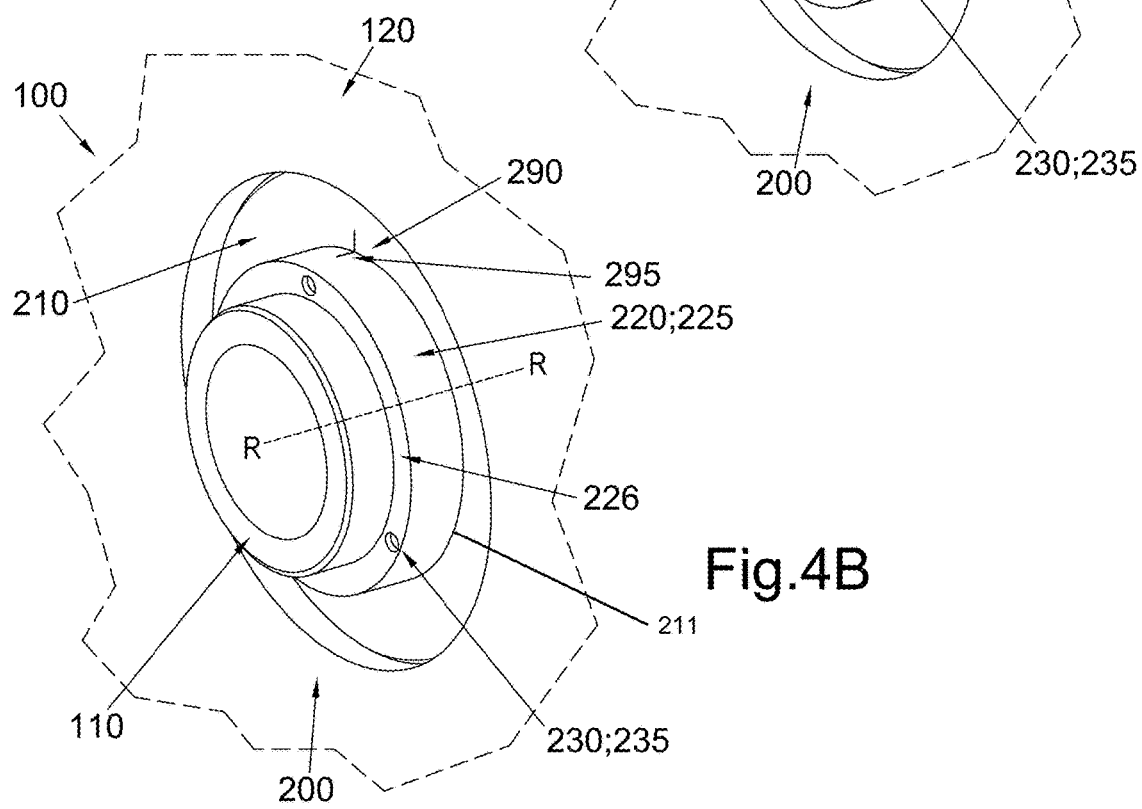

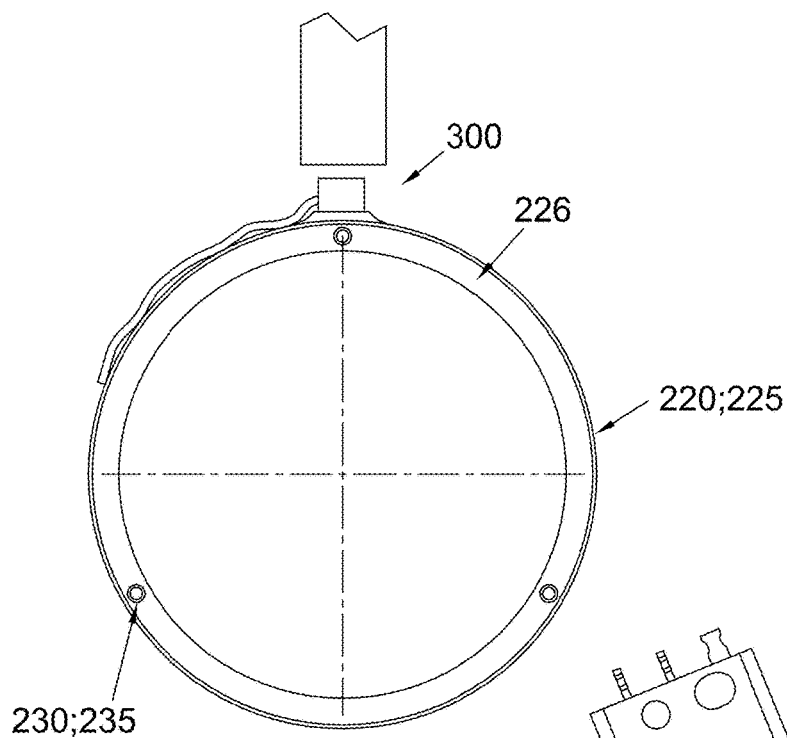
Fig.5
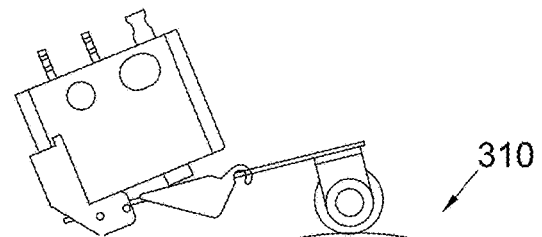
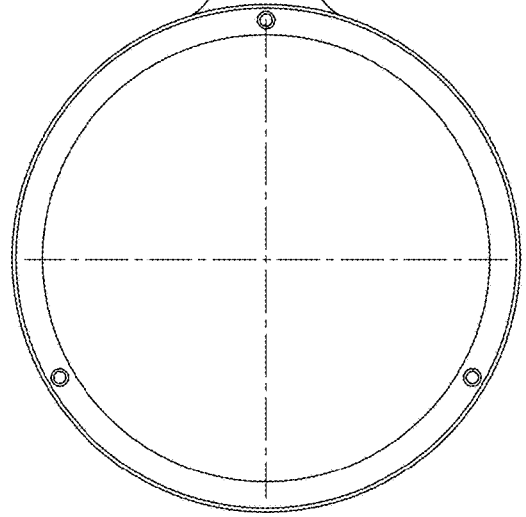
Fig.6
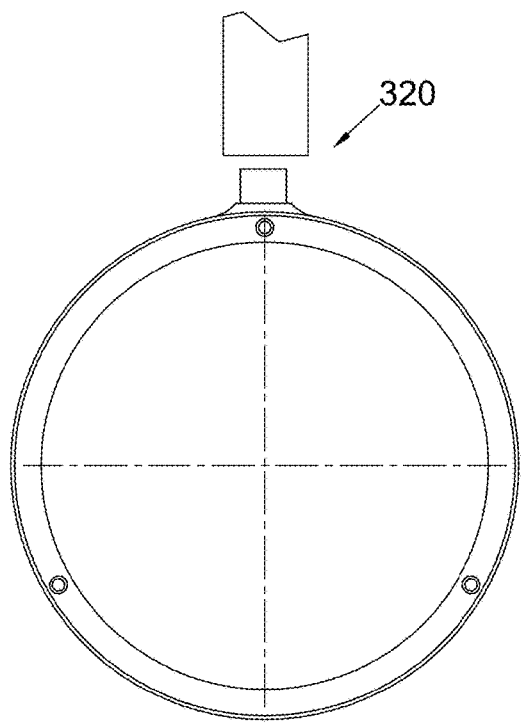
Fig.7

CONTROL STICK PIVOT

CROSS REFERENCE TO RELATED APPLICATIONS

This is a US National Stage of Application No. PCT/IB2016/000670, filed on Apr. 22, 2016, the disclosures of which are incorporated herein by reference.

FIELD

The present disclosure relates to a control stick pivot, for example a pivot for a control stick of an aircraft.

BACKGROUND

In a vehicle, a control stick may be provided to control the range of movement of the vehicle. The control stick may control a number of control parameters. For example, a control stick in an aircraft can be arranged to control the pitch and roll of the aircraft by allowing rotation of the control stick about a number of axes.

In order to facilitate rotation of the control stick about one of its axes, the shaft of the control stick may be mounted to a pivot bearing. Typical pivot bearings include ball bearings or rolling-element bearings. Rolling-element bearings, while providing a low-friction pivot, are susceptible to shock loads, breakage of the rolling-element, breakage of the bearing races, or wear due to dust or dirt entering the bearing.

To obviate these disadvantages, conventional control stick pivots often incorporate a second bearing assembled concentrically with the primary rolling-element bearing to provide redundancy; the second, redundant bearing becomes operable as a sliding bearing in the event that the primary rolling-element bearing fails. Thus, in the case of a control stick for an aircraft, the pilot is able to continue using the control stick should the rolling-element bearing fail.

The inventor has identified that while current pivot systems for control sticks may incorporate a redundant pivot to ensure that the pivot remains operative in the event that the primary bearing fails, they could be improved.

SUMMARY

According to an embodiment of the disclosure there is provided a control stick pivot, comprising: a primary pivot bearing; a redundant pivot bearing on one side of the primary pivot bearing, wherein the redundant pivot bearing becomes operative as a bearing in the event that the primary pivot bearing malfunctions; and a detection component for detecting malfunction of the primary pivot bearing.

In a further embodiment of the above, the detection component may comprise one or more features provided on the redundant pivot bearing for applying a torque to the redundant pivot bearing during maintenance or testing. The one or more features may be provided in an end face of the redundant pivot bearing.

In a further embodiment of any of the above, the features may comprise holes or recesses.

In a further embodiment of any of the above, the detection component may comprise a sensor configured to detect relative motion at an interface between the primary pivot bearing and the redundant pivot bearing.

In a further embodiment of any of the above, the sensor may be an optical sensor.

In a further embodiment of any of the above, the sensor may be an electrical sensor.

In a further embodiment of any of the above, the sensor may be a magnetic sensor.

In a further embodiment of any of the above, the redundant pivot bearing may be mounted to an outer surface of the primary pivot bearing.

In a further embodiment of any of the above, the redundant pivot bearing may be mounted to an inner surface of the primary pivot bearing.

In a further embodiment of any of the above, the control stick pivot may be a cylindrical control stick pivot In a further embodiment of any of the above, the control stick pivot may be a spherical control stick pivot.

In a further embodiment of any of the above, the redundant pivot bearing may comprise a bushing.

According to another embodiment of the disclosure there is provided a pivot assembly for use with a control stick of an aircraft, comprising: a shaft; a housing; and a control stick pivot provided about an end of said shaft and mounted in the housing, the control stick pivot comprising: a primary pivot bearing; a redundant pivot bearing on one side of the primary pivot bearing, wherein the redundant pivot bearing becomes operative as a bearing in the event that the primary pivot bearing malfunctions; and a detection component for detecting malfunction of the primary pivot bearing.

In a further embodiment of the above, the pivot assembly may be in the form of a control stick module for an aircraft.

In a further embodiment of any of the above, the detection component may comprise one or more features provided on the redundant pivot bearing for applying a torque to the redundant pivot bearing during maintenance or testing. The one or more features may be provided in an end face of the redundant pivot bearing.

In a further embodiment of any of the above, the features may comprise holes or recesses.

In a further embodiment of any of the above, the detection component may comprise a sensor configured to detect relative motion at an interface between the primary pivot bearing and the redundant pivot bearing.

In a further embodiment of any of the above, the sensor may be an optical sensor.

In a further embodiment of any of the above, the sensor may be an electrical sensor.

In a further embodiment of any of the above, the sensor may be a magnetic sensor.

In a further embodiment of any of the above, the redundant pivot bearing may be mounted to an outer surface of the primary pivot bearing.

In a further embodiment of any of the above, the redundant pivot bearing may be mounted to an inner surface of the primary pivot bearing.

In a further embodiment of any of the above, the control stick pivot may be a cylindrical control stick pivot In a further embodiment of any of the above, the control stick pivot may be a spherical control stick pivot.

In a further embodiment of any of the above, the redundant pivot bearing may comprise a bushing.

According to another embodiment of the disclosure there is provided a method for detecting the malfunction of a control stick pivot, comprising: in a control stick pivot which has a redundant pivot bearing on one side of a primary pivot bearing, the redundant pivot bearing becoming operative as a bearing in the event that the primary pivot bearing malfunctions, the method comprises using a detection component provided on the control stick pivot to detect malfunction of the primary pivot bearing.

In a further embodiment of the above, the detection component may comprise one or more features provided on the redundant pivot bearing for applying a torque to the redundant pivot bearing during maintenance or testing. The one or more features may be provided in an end face of the redundant pivot bearing. The method may include gauging the level of torque required for the different modes of the redundant pivot bearing to operate, either by feel or by measured values.

In a further embodiment of any of the above, the features may comprise holes or recesses.

In a further embodiment of any of the above, the detection component may comprise a sensor configured to detect relative motion at an interface between the primary pivot bearing and the redundant pivot bearing.

In a further embodiment of any of the above, the sensor may be an optical sensor.

In a further embodiment of any of the above, the sensor may be an electrical sensor.

In a further embodiment of any of the above, the sensor may be a magnetic sensor.

In a further embodiment of any of the above, the redundant pivot bearing may be mounted to an outer surface of the primary pivot bearing.

In a further embodiment of any of the above, the redundant pivot bearing may be mounted to an inner surface of the primary pivot bearing.

In a further embodiment of any of the above, the control stick pivot may be a cylindrical control stick pivot In a further embodiment of any of the above, the control stick pivot may be a spherical control stick pivot.

In a further embodiment of any of the above, the redundant pivot bearing may comprise a bushing.

These and other features of the systems and methods of the subject disclosure will become more readily apparent to those skilled in the art from the following detailed description taken in conjunction with the drawings, which illustrate embodiments of the present disclosure by way of example only.

FIGURES

So that those skilled in the art to which the subject disclosure appertains will readily understand how to make and use the devices and methods of the subject disclosure without undue experimentation, embodiments thereof will be described in detail herein below by way of example and with reference to certain figures, wherein:

FIG. 4 shows a schematic of an exemplary maintenance tool in use for detecting malfunction of the primary pivot bearing;

FIG. 4A shows a schematic of an exemplary frangible link serving as a visual indicator for detecting malfunction of the primary pivot bearing;

FIG. 4B shows a schematic of an exemplary alignment guide serving as a visual indicator for detecting malfunction of the primary pivot bearing;

FIG. 5 shows a schematic of an exemplary optical sensor for detecting malfunction of the primary pivot bearing;

FIG. 6 shows a schematic of an exemplary electrical sensor for detecting malfunction of the primary pivot bearing; and FIG. 7 shows a schematic of an exemplary magnetic sensor for detecting malfunction of the primary pivot bearing.

DETAILED DESCRIPTION

Figure 1:
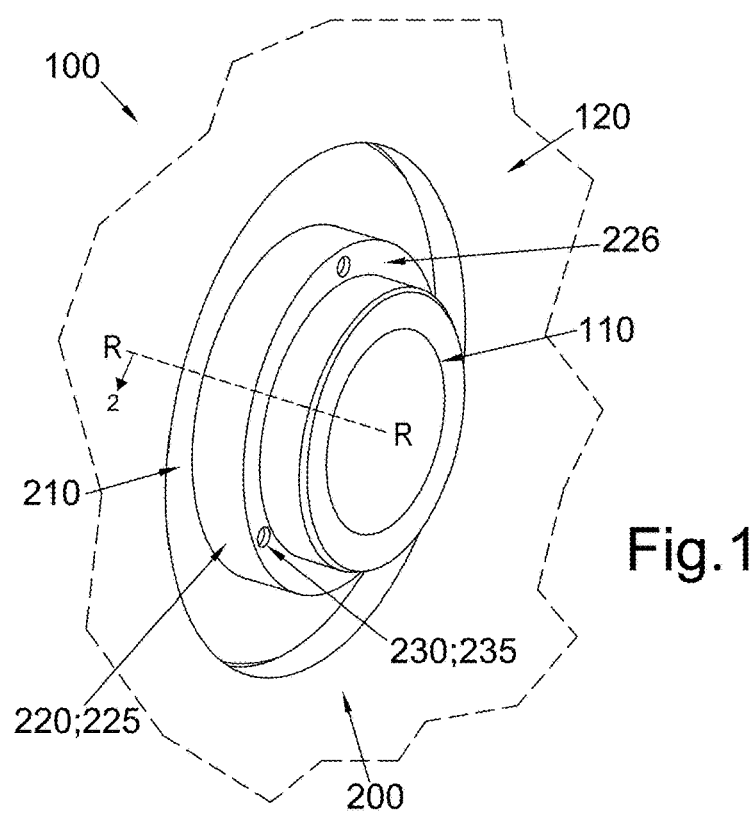
FIG. 1 shows a schematic of an exemplary pivot assembly for use in a control stick of an aircraft.

Reference will now be made to the drawings wherein like reference numerals identify similar structural features or aspects of the subject disclosure. For purposes of explanation and illustration, and not limitation, an illustrative view of an embodiment of a pivot assembly for a control stick is shown in FIG. 1 and is designated generally by reference character 100. Other aspects of this disclosure are shown in FIGS. 2 to 7.

The pivot assembly 100 comprises a shaft 110, having a longitudinal axis R-R about which said shaft 110 can rotate. A control stick pivot 200 is provided about an end of said shaft 110. The control stick pivot 200 may be provided within a housing 120.

The control stick pivot 200 comprises a primary pivot bearing 210 and a redundant pivot bearing 220 (a secondary pivot bearing), both concentric about shaft 110. Primary pivot bearing 210 and redundant pivot bearing 220 are both configured to rotate about axis R-R. Primary pivot bearing 210 may comprise an outer element 212 (for example, an outer bearing race) and an inner element 214 (for example, an inner bearing race). Redundant pivot bearing 220 may comprise a bushing 225.

Figure 2:
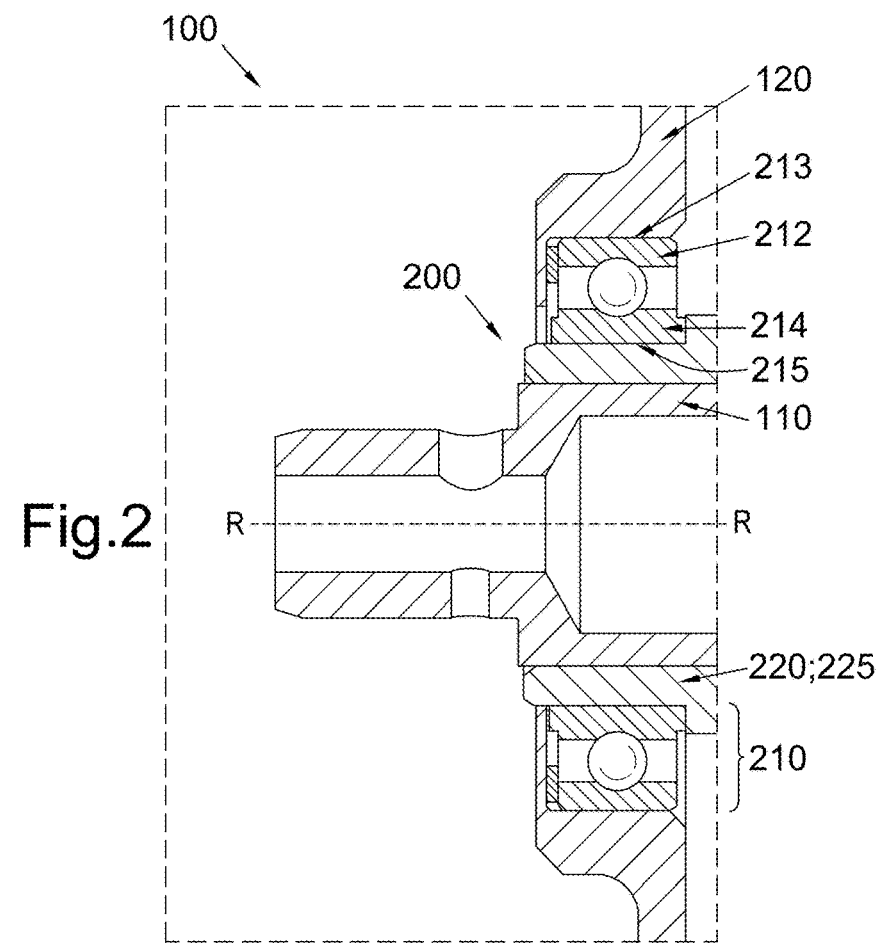
FIG. 2 shows a cross-sectional view of the pivot assembly of FIG. 1 taken along line 2-2 having a cylindrical profile.

In one embodiment, as illustrated in FIGS. 1 and 2, redundant pivot bearing 220 may be provided between the primary pivot bearing 210 and the shaft 110. In this embodiment, an outer surface 213 of outer element 212 may be fixed to the housing 120. An inner surface 215 of inner element 214 may be provided about the redundant pivot bearing 220.

In this embodiment, in the primary mode of operation there is minimal or no relative movement between the redundant pivot bearing 220 and the inner element 214. As shaft 110 rotates about axis R-R, redundant pivot bearing 220 rotates with the shaft 110. Rotation of the redundant pivot bearing 220 causes the inner element 214 to rotate about axis R-R. Since outer element 212 is fixed to the housing, there is relative motion between the inner element 214 and outer element 212.

However, should the primary pivot bearing 210 malfunction, such that primary pivot bearing 210 seizes or fails to operate efficiently, sliding contact between the redundant pivot bearing 220 and inner element 214 or between the redundant pivot bearing 220 and the shaft 110 commences. Thus, the redundant pivot bearing 220 becomes operative as a pivot. In this way, shaft 110 is still able to rotate about axis R-R.

Figure 3:
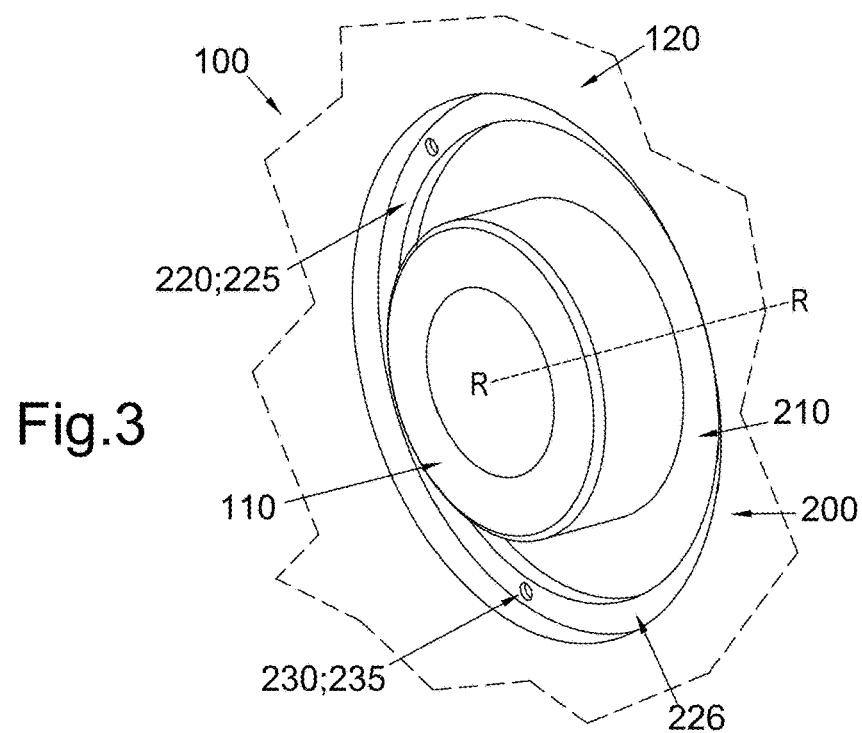
FIG. 3 shows a schematic of an exemplary pivot assembly for use in a control stick of an aircraft.

In another embodiment, as illustrated in FIG. 3, redundant pivot bearing 220 may be mounted to an outer surface of the primary pivot bearing 210, such that it is provided between the primary pivot bearing 210 and the housing 120. In the primary mode of operation, there is minimal or no relative movement between the redundant pivot bearing 220 and the outer element 212 of the primary pivot bearing 210. As shaft 110 rotates about axis R-R, the inner element 214 of the primary pivot bearing 210 rotates with the shaft 110. Thus relative motion between the inner element 214 and outer element 212 is achieved and the primary pivot bearing 210 is operative as a pivot.

However, in the instance that the primary pivot bearing 210 malfunctions, sliding contact between the redundant pivot bearing 220 and the outer element 212 or between the redundant pivot bearing 220 and the housing 120 commences. Thus, the redundant pivot bearing 220 becomes operative as a pivot. In this way, shaft 110 and primary pivot bearing 210 is still able to rotate about axis R-R.

It is understood that primary pivot bearing 210 may be any desired bearing, for example a rolling-element bearing or other low-friction bearing. It may comprise for example ball bearings, roller bearings or other rolling-elements. Thus, in the primary mode of operation, the primary pivot bearing 210 may operate with rolling contact (for example between outer element 212 and inner element 214). However, when the redundant pivot bearing 220 becomes operative, sliding contact is initiated between the redundant pivot bearing 220 and its adjacent component, for example inner element 214 in the case of the embodiment illustrated in FIGS. 1 and 2.

The torque required to turn shaft 110 is inherently greater when the control stick pivot 200 is operating with sliding contact rather than rolling contact. Thus the user will detect a failure of the primary pivot bearing 210 as the control stick will feel stiffer to manoeuvre. However, it is important that the control stick remains ergonomic to use. The choice of material for the redundant pivot bearing 220 may therefore be selected to require a desired level of friction torque in the shaft 110 before it becomes operative which is not significantly different to impart control issues but which might still be observable to an alert pilot.

The redundant pivot bearing 220 or bushing 225 may comprise or be made entirely of plastic. An advantage of using plastic is that it avoids galvanic corrosion with the other components and so is less likely to seize. It may also provide an insulating layer to help prevent galvanic corrosion between the parts either side. However, it is anticipated that the redundant pivot bearing 220 or bushing 225 may be formed from any suitable material or combination of materials.

The redundant pivot bearing 220 could also comprise other forms of bearing, for example, even a rolling-element bearing where an operative level of torque can set sufficiently high enough that it operates upon malfunction of the primary pivot bearing 210.

Figure 2A:
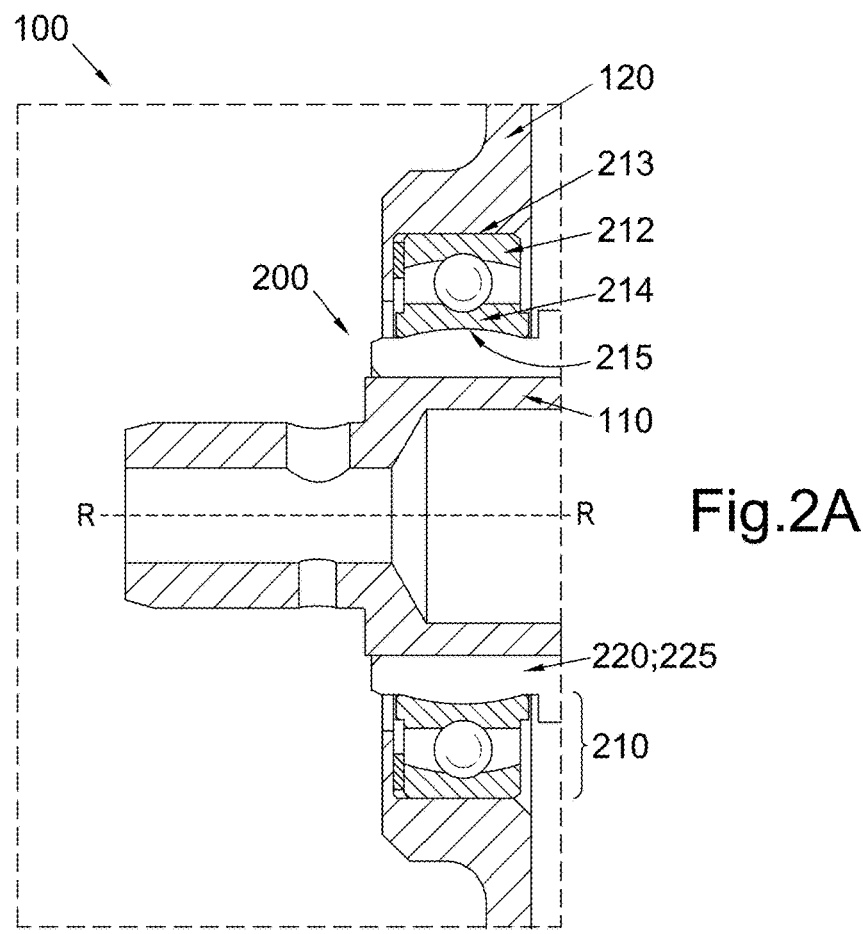
FIG. 2A shows a cross-sectional view taken along line 2-2 of FIG. 1 of an exemplary pivot assembly having a spherical profile.

While FIG. 2 shows control stick pivot 200 with a cylindrical profile, it is anticipated that control stick pivot 200 can have a spherical profile, as shown in FIG. 2A.

The control stick pivot 200 comprises a detection component for detecting malfunction of primary pivot bearing 210. Referring additionally now to FIG. 4, redundant pivot bearing 220 may comprise one or more features 230 provided on the redundant pivot bearing 226, for example on an end face 226 of the redundant pivot bearing 220.

The features 230 may comprise holes 235 or recesses which may extend longitudinally into the redundant pivot bearing 220. The features 230 may be circular in cross-section as shown or other shapes. A maintenance tool 240 may be provided which is configured to engage with the features 230. During maintenance, maintenance tool 240 may be inserted into the features 230. By rotating the maintenance tool 240 about the shaft axis R-R, redundant pivot bearing 220 can be rotated about said axis R-R.

The engineer can determine whether primary pivot bearing 210 has malfunctioned or whether redundant pivot bearing 220 is operational. The maintenance engineer ensures the shaft 110 is held steady so as not to rotate about axis R-R, then employs the maintenance tool 240 to rotate the redundant pivot bearing 220 about axis R-R. By gauging the level of torque required for the different modes of the redundant pivot bearing 220 to operate, either by feel or by measured values, malfunction of the primary pivot bearing 210 can be detected.

If redundant pivot bearing 220 is mounted to an inner surface of the primary pivot bearing 210, such that it is provided between the primary pivot bearing 210 and the shaft 110 as shown in FIGS. 1 and 2, redundant pivot bearing 220 will be in contact with inner element 214 of the primary pivot bearing 210. If inner element 214 rotates with redundant pivot bearing 220 in tow, the primary pivot bearing 210 is working effectively. However, if the redundant pivot bearing 220 rotates independently of inner element 214, this may indicate that the primary pivot bearing 210 has malfunctioned. Similarly, if the redundant pivot bearing 220 rotates relative to the shaft 110, this may indicate that the primary pivot bearing 210 has malfunctioned.

If redundant pivot bearing 220 is mounted to an outer surface of the primary pivot bearing 210, such that it is provided between the primary pivot bearing 210 and the housing 120 as shown in FIG. 3, redundant pivot bearing 220 will be in contact with outer element 212 of the primary pivot bearing 210. If outer element 212 rotates with redundant pivot bearing 220 in tow, the primary pivot bearing 210 is working effectively. However, if the redundant pivot bearing 220 rotates independently of outer element 212, this may indicate that the primary pivot bearing 210 has malfunctioned. Similarly, if the redundant pivot bearing 220 rotates relative to the housing 120, this may indicate that the primary pivot bearing 210 has malfunctioned.

The control stick pivot 200 may further comprise a detection component comprising a visual indicator to alert the user or maintenance engineer that the primary pivot bearing 210 has malfunctioned. It is anticipated that such a visual indicator may comprise a frangible link 280, as shown in FIG. 4A, between the primary pivot bearing 210 and the redundant pivot bearing 220 and/or other adjacent component(s) such as the shaft 110 or housing 120. In the instance that the primary pivot bearing 210 malfunctions, sliding contact at the interface 211 between the primary pivot bearing 210 and the redundant pivot bearing 220 commences, breaking the frangible link 280 and indicating to the user that the primary pivot bearing 210 has failed.

An alternative visual indicator may comprise an alignment guide, as shown in FIG. 4B. A first marker 290 may be provided, for example, on the primary pivot bearing 210, and a second marker 295 may be provided on redundant pivot bearing 220. During installation of the control stick pivot, the redundant pivot bearing 220 can be fitted such that the first marker 290 and the second marker 295 are aligned. In the instance that the primary pivot bearing 210 malfunctions, sliding contact at the interface 211 between the primary pivot bearing 210 and the redundant pivot bearing 220 commences, causing the first and second markers 290, 295 to move out of alignment, and thus indicate to the user that the primary pivot bearing 210 has malfunctioned. It is anticipated that the first and second markers 290, 295 may be printed, etched or embossed.

In addition to or as an alternative to the detection component discussed above, the pivot mechanism may comprise a detection component comprising a sensor configured to detect relative motion at the interface between the primary pivot bearing 210 and the redundant pivot bearing 220.

Referring now to FIGS. 5, 6 and 7, control stick pivot 200 may comprise an optical sensor 300 comprising a light sensitive cell. In addition or as an alternative, control stick pivot 200 may comprise an electrical sensor 310 comprising a switch. In addition or as an alternative, control stick pivot 200 may comprise a magnetic sensor 320 comprising a magnet and proximity switch.

When relative movement between the primary pivot bearing 210 and the redundant pivot bearing 220 is detected, an alarm may be raised to alert the operator and/or engineer that the primary pivot bearing 210 has malfunctioned.

The present disclosure further provides a control stick module comprising a control stick pivot, comprising: a primary pivot bearing; a redundant pivot bearing on one side of the primary pivot bearing, wherein the redundant pivot bearing becomes operative as a bearing in the event that the primary pivot bearing malfunctions; and a detection component for detecting malfunction of the primary pivot bearing.

While the apparatus and methods of the subject disclosure have been shown and described with reference to embodiments, those skilled in the art will readily appreciate that changes and/or modifications may be made thereto without departing from the scope of the subject disclosure.

The following clause sets out features of the present disclosure which may or may not presently be claimed but which may form basis for future amendments and/or a divisional application. A method for detecting malfunction of a control stick pivot, comprising: in a control stick pivot which has a redundant pivot bearing on one side of a primary pivot bearing, the redundant pivot bearing becoming operative as a bearing in the event that the primary pivot bearing malfunctions, the method comprises detecting malfunction of the primary pivot bearing using a detection component provided on the control stick pivot.

The invention claimed is:

1. A control stick pivot, comprising:
    a primary pivot bearing;
    a redundant pivot bearing on one side of the primary pivot bearing, wherein the redundant pivot bearing is concentric with the primary pivot bearing so that there is an interface between the primary pivot bearing and the redundant pivot bearing, and wherein the redundant pivot bearing becomes operative as a bearing in the event that the primary pivot bearing malfunctions so that rotation is enabled by the redundant pivot bearing instead of the primary pivot bearing; and
    a detection component for detecting malfunction of the primary pivot bearing.

2. The control stick pivot of claim 1, wherein the detection component comprises one or more features provided on the redundant pivot bearing for applying a torque to the redundant pivot bearing during maintenance or testing.

3. The control stick pivot of claim 2, wherein the features comprise holes or recesses.

4. The control stick pivot of claim 1, wherein the detection component comprises a sensor configured to detect relative motion at the interface between the primary pivot bearing and the redundant pivot bearing.

5. The control stick pivot of claim 4, wherein the sensor is an optical sensor.

6. The control stick pivot of claim 4, wherein the sensor is an electrical sensor.

7. The control stick pivot of claim 4, wherein the sensor is a magnetic sensor.

8. The control stick pivot of claim 1, wherein the redundant pivot bearing is mounted to an outer surface of the primary pivot bearing.

9. The control stick pivot of claim 1, wherein the redundant pivot bearing is mounted to an inner surface of the primary pivot bearing.

10. The control stick pivot of claim 1, wherein the control stick pivot is a cylindrical control stick pivot or a spherical control stick pivot.

11. A pivot assembly for use with a control stick of an aircraft, comprising:
    a shaft;
    a housing; and
    a control stick pivot according to claim 1, provided about an end of said shaft and mounted in the housing.

12. A method for detecting malfunction of a control stick pivot, comprising:
    in a control stick pivot which has a redundant pivot bearing on one side of a primary pivot bearing, wherein the redundant pivot bearing is concentric with the primary pivot bearing so that there is an interface between the primary pivot bearing and the redundant pivot bearing, the redundant pivot bearing becoming operative as a bearing in the event that the primary pivot bearing malfunctions so that rotation is enabled by the redundant pivot bearing instead of the primary pivot bearing, the method comprises using a detection component provided on the control stick pivot to detect malfunction of the primary pivot bearing.

13. The method of claim 12, wherein the detection component comprises one or more features provided on the redundant pivot bearing for applying a torque to the redundant pivot bearing during maintenance or testing and gauging the level of torque required for the different modes of the redundant pivot bearing to operate, either by feel or by measured values.

14. The method of claim 12, wherein the detection component comprises a sensor configured to detect relative motion at an interface between the primary pivot bearing and the redundant pivot bearing.

15. A control stick pivot, comprising:
    a primary pivot bearing;
    a redundant pivot bearing on one side of the primary pivot bearing, wherein the redundant pivot bearing becomes operative as a bearing in the event that the primary pivot bearing malfunctions; and
    a detection component for detecting malfunction of the primary pivot bearing, wherein the detection component comprises a sensor configured to detect relative motion at an interface between the primary pivot bearing and the redundant pivot bearing.

16. The control stick pivot of claim 15, wherein the detection component comprises one or more features provided on the redundant pivot bearing for applying a torque to the redundant pivot bearing during maintenance or testing.

17. The control stick pivot of claim 16, wherein the features comprise holes or recesses.

18. The control stick pivot of claim 15, wherein the sensor is an optical sensor.

19. The control stick pivot of claim 15, wherein the sensor is an electrical sensor.

20. The control stick pivot of claim 15, wherein the sensor is a magnetic sensor.

* * * * *